United States Patent [19]

Mimasu

[11] 4,249,746
[45] Feb. 10, 1981

[54] TRACKING CONTROL FOR A VIDEO DISC PLAYER

[75] Inventor: Kazuo Mimasu, Soraku, Japan

[73] Assignee: Sharp Kabushiki Kaisha, Osaka, Japan

[21] Appl. No.: 33,710

[22] Filed: Apr. 26, 1979

[30] Foreign Application Priority Data

Apr. 27, 1978 [JP] Japan .................. 53-50840

[51] Int. Cl.³ .............................................. G11B 21/04
[52] U.S. Cl. ................................................... 369/221
[58] Field of Search .................. 274/13 R, 14, 15 R, 274/23 A, 39 A; 358/128.5, 128; 179/100.16

[56] References Cited

U.S. PATENT DOCUMENTS

| 1,933,457 | 10/1933 | Sykes | 274/13 R |
| 3,363,908 | 1/1968 | Miner et al. | 274/13 R |
| 3,993,315 | 11/1976 | Hansen et al. | 274/23 A |
| 3,993,316 | 11/1976 | Fairbanks | 274/23 A |
| 4,040,634 | 8/1977 | Leedom | 358/128 |

Primary Examiner—John W. Shepperd
Attorney, Agent, or Firm—Birch, Stewart, Kolasch & Birch

[57] ABSTRACT

A linear tracking control system for a video disc player comprising a playback transducer drive motor in addition to a turntable drive motor. A high voltage forward signal is applied to the playback transducer drive motor for performing a fast forward movement of the playback transducer. A high voltage reverse signal having a polarity opposite to the forward signal is applied to the playback transducer drive motor for achieving the fast reverse movement. A playback tracking control signal is intermittently applied to the playback transducer drive motor upon every four rounds of the turntable in order to intermittently advance the playback transducer in the playback operation.

11 Claims, 11 Drawing Figures

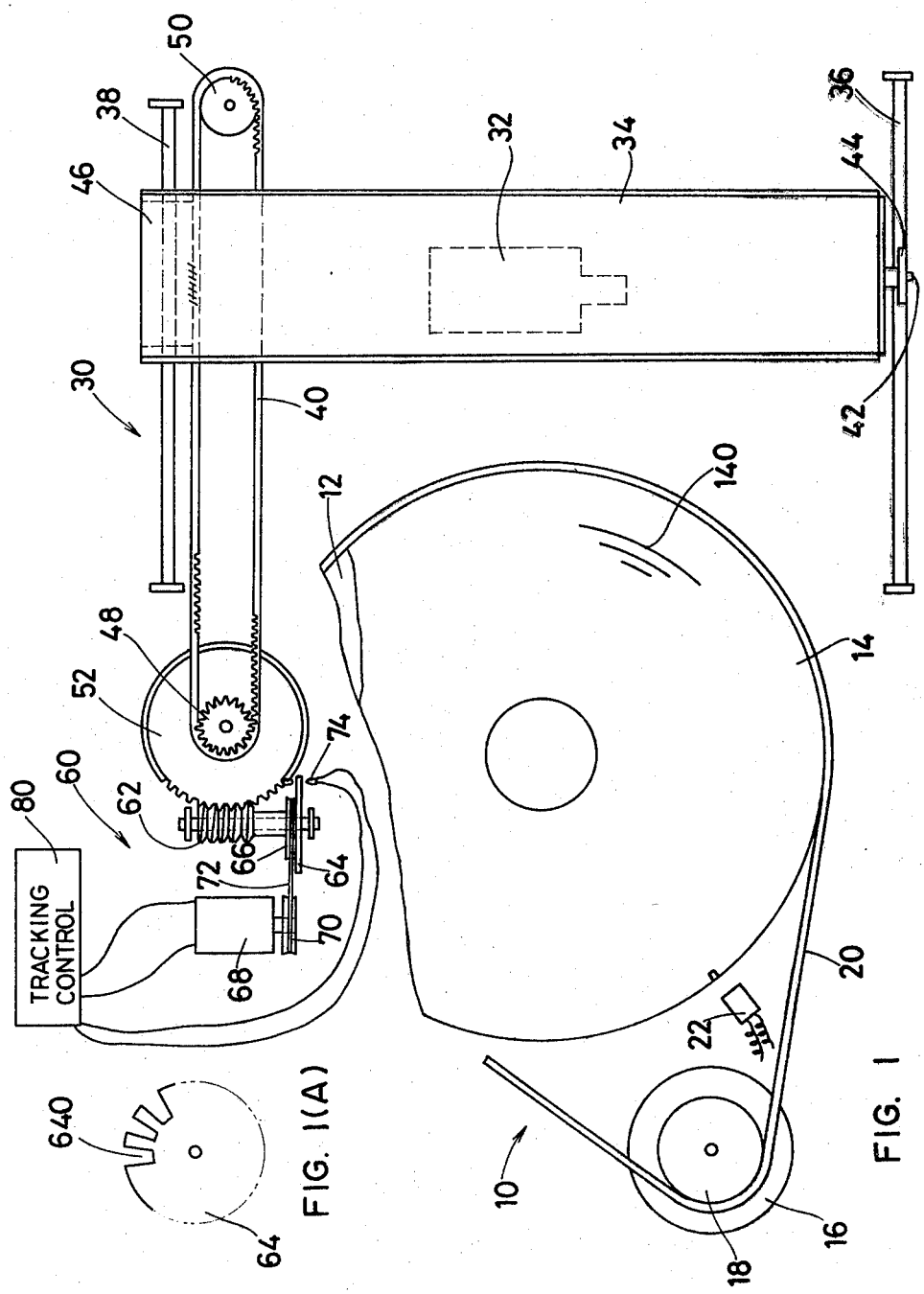

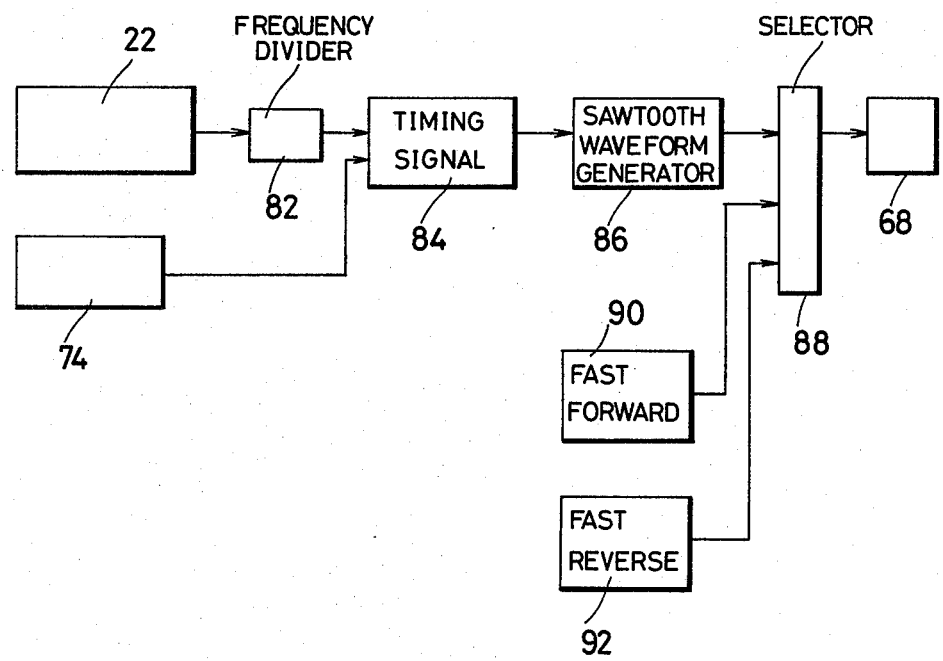
FIG. 2 (TRACKING CONTROL-80-)

TRACKING CONTROL FOR A VIDEO DISC PLAYER

BACKGROUND AND SUMMARY OF THE INVENTION

The present invention relates to a video disc player and, more particularly, to a linear tracking control system for a disc player.

A typical tracking control system is disclosed in Japanese Patent Laid Open Publication No. 50-130318 (corresponding to U.S. patent application Ser. No. 454,168 now U.S. Pat. No. 3,870,320 filed on Mar. 25, 1974), wherein a tracking drive operation is mechanically associated with rotation of a turntable upon which a video disc is mounted. More specifically, a fast drive timing belt and a playback drive timing belt are mechanically associated with a drive shaft of the turntable to transfer the rotation of the turntable to a drive mechanism of a playback transducer device. A playback drive solenoid, a fast forward drive solenoid and a fast reverse drive solenoid are provided for selectively driving the playback transducer device at three different modes.

Therefore, the conventional tracking control system is complicated and occupies a large space, because of provision of the three solenoids.

Accordingly, an object of the present invention is to provide a novel tracking control system for a disc player.

Another object of the present invention is to provide a simplified linear tracking system for a video disc player.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a playback transducer drive motor is provided in addition to a turntable drive motor. A tracking control system functions to selectively enable the playback transducer drive motor to selectively drive the playback transducer device at a playback mode, a fast forward mode or a fast reverse mode.

More specifically, in the fast forward mode, the playback transducer drive motor is rotated forward at a high speed. The playback transducer drive motor is rotated backward at a high speed in the fast reverse mode. In the playback mode, the playback transducer drive motor is intermittently rotated forward at a low speed. Under these three operation modes, the turntable is continuously driven to rotate at a fixed high speed by the turntable drive motor.

The above-mentioned selective drive can be performed by controlling the polarity and the amplitude of a drive signal to be applied to a D.C. motor. In a preferred form, the intermittent rotation of the playback transducer drive motor is controlled so that the playback transducer drive motor is rotated by a predetermined angle $\theta$ upon every four rounds of the turntable.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a schematic plan view of an embodiment of a disc player system of the present invention;

FIG. 1(A) is a plan view of a slit plate included in the disc player system of FIG. 1;

FIG. 2 is a block diagram of a tracking control system included in the disc player system of FIG. 1;

DESCRIPTION OF THE PREFERRED EMBODIMENTS

Figure 3A:
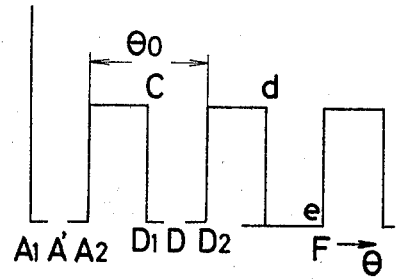
FIG. 3(A) is a graph showing worm rotation checker output signal versus worm rotation angle characteristics of a playback transducer drive system of the present invention.

FIG. 1 schematically shows an embodiment of a disc player system of the present invention.

The disc player system of the present invention mainly comprises a turntable drive system 10, a playback transducer guide mechanism 30, a playback transducer drive mechanism 60, and a tracking control system 80. The playback transducer drive mechanism 60 is controlled by an output signal derived from the tracking control system 80 so that a playback transducer 32 is linearly driven at three different modes, namely, a fast forward mode, a fast reverse mode, and a playback mode.

The turntable drive system 10 comprises a turntable 12, a turntable drive motor 16 and a turntable rotation checker 22. A pulley 18 is fixed to the drive shaft of the turntable drive motor 16 to drive the turntable 12 through a drive belt 20. A video disc 14 is mounted on a turntable 12 for playback purposes. The video disc 14 includes a spiral groove 140 carrying the video information. The turntable rotation checker 22 develops one pulse signal for every rotation of the turntable 12. The pulse signal derived from the turntable rotation checker 22 is utilized to control the turntable rotation, that is, to fix the rotation velocity of the turntable 12.

The playback transducer guide mechanism 30 comprises the playback transducer 32 and a carriage 34 for supporting the playback transducer 32. The playback transducer 32 includes a playback stylus which is engaged in the spiral groove 140 for playback purposes.

The carriage 34 is slidably mounted on a pair of guide rails 36 and 38. A timing belt 40 is fixed to the carriage 34 via a slide table 46 to perform the linear tracking operation. More specifically, a shaft 42 is secured to one end of the carriage 34. A roller 44 is secured to the shaft 42, which is mounted on the guide rail 36. The slide table 46, which includes two slidable bearings, is fixed to the other end of the carriage 34. The two slidable bearings are mounted on the guide rail 38. The timing belt 40 is extended between timing pulleys 48 and 50. A worm wheel 52 is secured to the shaft of the timing pulley 48.

Another example of the above-mentioned turntable drive system 10 and the playback transducer guide mechanism 30 is disclosed in Japanese Patent Laid Open Publication No. 50-130318 (corresponding to U.S. patent application Ser. No. 454,168 now U.S. Pat. No. 3,870,320 filed on Mar. 25, 1974). A typical construction of the playback transducer up/down drive system is disclosed in Japanese Patent Laid Open Publication No. 52-37029 (corresponding to U.S. patent application Ser. No. 667,309 now U.S. Pat. No. 4,053,161 filed on Mar. 16, 1976). Since the playback transducer up/down drive system does not constitute an essential part of the present invention, detailed description thereof has been omitted for the purposes of simplicity.

The playback transducer drive mechanism 60 comprises a reversably rotatable motor 68, and a worm 62, which is geared to the worm wheel 52. A pulley 66 and a slit plate 64 are secured to the shaft of the worm 62. Another pulley 70 is secured to the output shaft of the reversably rotatable motor 68 in order to transfer the rotation of the motor 68 to the worm 62 through a belt 72. The slit plate 64 is provided with a plurality of uniformly aligned slits 640 as shown in FIG. 1(A). A worm rotation checker 74, which comprises a light emitting element and a light responsive element, is associated with the slit plate 64 in order to control the rotation of the reversably rotatable motor 68 in the playback mode.

The tracking control system 80 develops a control signal for controlling the rotation of the reversably rotatable motor 68. More specifically, the tracking control system 80 develops a high voltage forward signal for performing the fast forward movement of the playback transducer 32. The tracking control system 80 also develops a high voltage reverse signal, which has the polarity opposite to the high voltage forward signal, for performing the fast reverse movement of the playback transducer 32. In the playback mode, the tracking control system 80 intermittently develops a sawtooth waveform control signal to intermittently advance the playback transducer 32. The reversably rotatable motor 68 is the conventional D.C. motor.

FIG. 2 shows the tracking control system 80. The tracking control system 80 mainly comprises a sawtooth waveform generator 86 for intermittently developing the sawtooth waveform control signal, a fast forward control signal generator 90 for developing the high voltage forward signal, a fast reverse control signal generator 92 for developing the high voltage reverse signal, and a selection circuit 88 for selectively applying the control signals derived from the sawtooth waveform generator 86, the fast forward control signal generator 90 and the fast reverse control signal generator 92 to the reversably rotatable motor 68.

The intermittent playback tracking is performed by a frequency divider 82 and a timing signal generator 84. The pulse signal derived from the turntable rotation checker 22 is applied to the frequency divider 82, which develops an output signal upon every four rotations of the turntable 12. The timing signal generator 84 develops a control signal for activating the sawtooth waveform generator 86 in response to the output signal of the frequency divider 82. An output signal derived from the worm rotation checker 74 is applied to the timing signal generator 84 to exactly control the intermittent advance of the playback transducer 32 in the playback mode.

The playback tracking operation will be described, in detail, with reference to FIGS. 3(A) through 5(B). In this example, the playback transducer 32 is intermittently advanced step by step upon every four rotations of the turntable 12. The playback stylus exactly follows the spiral groove 140 formed in the video disc 14, even though the playback transducer 32 is intermittently driven, because of the elastic support mechanism of the playback stylus.

The worm rotation checker 74 develops the output signal, as shown in FIG. 3(A), which bears the high level when the light beam passes through the slit 640, and bears the low level when the light beam is interrupted by the slit plate 64. FIG. 3(A) shows the relationship between the worm rotation angle $\theta$ (along the abscissa axis) and the output signal of the worm rotation checker 74 (along the ordinate axis).

Figure 4A:
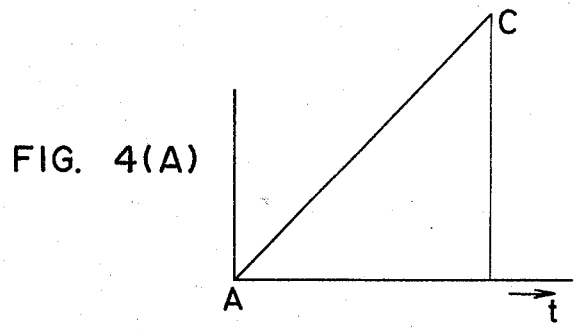
FIGS. 4(A) and 4(D) are graphs showing drive voltage applied to a motor versus time lapse characteristics of the playback transducer drive system of the present invention.

The sawtooth waveform generator 86 develops the sawtooth waveform control signal, as shown in FIG. 4(A), upon every four rounds of the turntable 12. More specifically, the voltage signal applied to the reversably rotatable motor 68 is gradually increased from a point A upon initiation of the development of the control signal from the timing signal generator 84 toward a point C, at which the generation of the control signal from the timing signal generator 84 is terminated. The generation of the control signal from the timing signal generator 84 is terminated when the output signal of the worm rotation checker 74 is changed from the high level to the low level (point C in FIG. 3(A)).

Even when the voltage signal applied to the reversably rotatable motor 68 is returned to the zero level, the worm 62 continues to rotate due to the inertia. Therefore, the worm 62 is held stationary at a point D shown in FIG. 3(A).

To perform an accurate tracking operation, it is required that the worm 62 held stationary between points $A_1$ and $A_2$ (FIG. 3(A)) is driven to rotate by the sawtooth waveform control signal and again held stationary between points $D_1$ and $D_2$. That is, the one step rotation of the warm 62 must be fixed to an angle $\theta_o$ shown in FIG. 3(A).

Now assume that the worm 62 is temporarily held at the point A' of FIG. 3(A) before generation of the sawtooth waveform control signal.

Figure 4B:
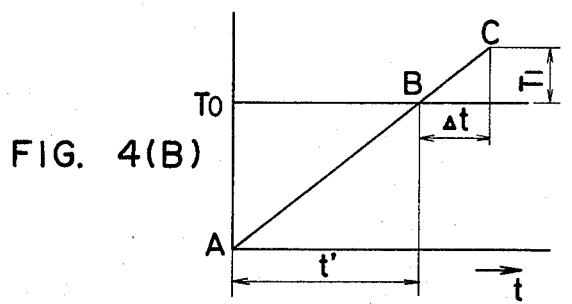
FIGS. 4(B) and 4(C) are graphs showing worm torque versus time lapse characteristics of the playback transducer drive system of the present invention.

When the sawtooth waveform control signal as shown in FIG. 4(A) is applied to the reversably rotatably motor 68, the shaft of the worm 62 receives the torque as shown in FIG. 4(B), wherein the load torque for shifting the playback transducer 32 is represented as $T_o$.

In FIG. 4(B), the worm 62 and the reversably rotatable motor 68 do not rotate between points A and B, because the load torque $T_o$ is greater than the drive torque. Therefore, the worm 62 and the reversely rotatable motor 68 begin to rotate at the point B, and the output torque is returned to zero at a point C.

Figure 3B:
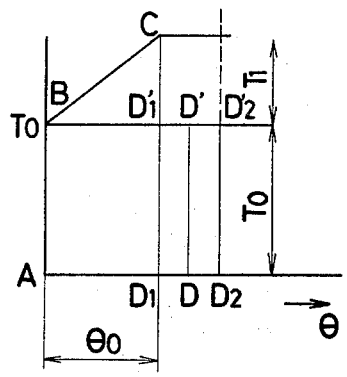
FIG. 3(B) is a graph showing worm torque versus worm rotation angle characteristics of the playback transducer drive system of the present invention.

FIG. 3(B) shows the relationship between the rotation angle $\theta$ of the worm 62 (along the abscissa axis) and the output torque of the reversably rotatable motor 68 (along the ordinate axis) under the above-mentioned conditions. That is, the worm 62 does not rotate between the points A and B. The worm 62 rotates between the points B and C with increasing the torque. And, then, the worm 62 continues to rotate to a point D because of the inertia.

The energy generated by the reversably rotatable motor 68 corresponds to the area surrounded by $ABCD_1$. The energy consumed till the point C corresponds to the area surrounded by $ABD'_1D_1$. Therefore, the energy corresponding to the area $\Delta BCD'_1$ is remained when the worm 62 rotates to the point C. The thus remained energy causes the over running of the playback transducer 32.

It is required that the following relationship is fulfilled in order to stop the rotation of the worm 62 by a limit point $D_2$.

$$\Delta BCD'_1 < \Box D_1 D'_1 D'_2 D_2$$

Now assume that the required one pitch is $\theta_0$, and the length $CD'_1$ is represented as "$T_1$" as shown in FIG. 3(B). Then, the above condition can be represented:

$$(3\theta_0 \cdot T_1)/4 < (\theta_0 \cdot T_0)/2$$

That is, $$3/2 T_1 < T_0$$

This corresponds to, in FIG. 4(B), $$3/2 \Delta t < t'$$

In FIG. 4(B), $\Delta t$ can be determined by the moment of inertia of the worm 62 and the reversably rotatable motor 68 and the slope of the sawtooth waveform control signal shown in FIG. 4(A). "$\Delta t$" can be selected considerably shorter than "t'", because the time period required for one step advance must be selected shorter than the time period required for four rounds of the turntable 12. Therefore, the above-mentioned condition can be easily fulfilled.

Figure 4C:
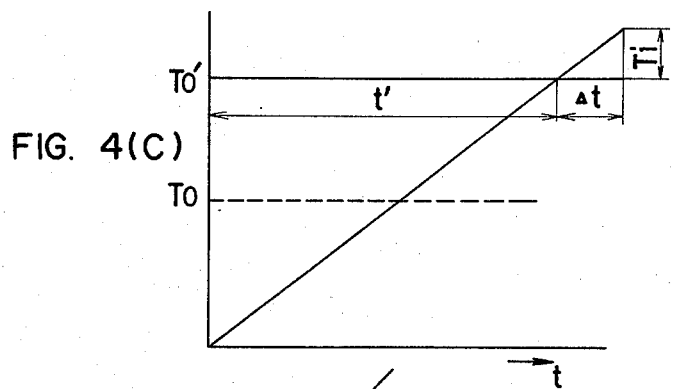

Since the timing signal generator 84 is responsive to the output signal derived from the worm rotation checker 74, "$\Delta t$" is fixed even when the load torque $T_o$ varies to "$T'_0$" as shown in FIG. 4(C).

Figure 4D:
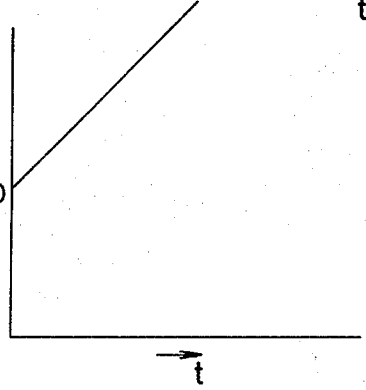

In order to achieve fast completion of the one step advance, the sawtooth waveform control signal can be biased to a predetermined level. FIG. 4(D) shows the control signal in this example, wherein the voltage signal applied to the reversely rotatable motor 68 is gradually increased from a voltage level $E_0$. The voltage level $E_0$ can be selected slightly lower than the level at which the worm 62 begins to rotate.

Figure 5A:
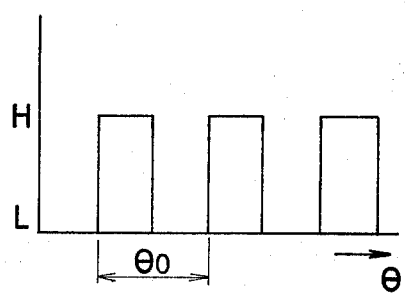
FIG. 5(A) is a graph showing worm rotation checker output signal versus worm rotation angle characteristics of the playback transducer drive system of the present invention, wherein a constant voltage signal is applied to the motor.
Figure 5B:
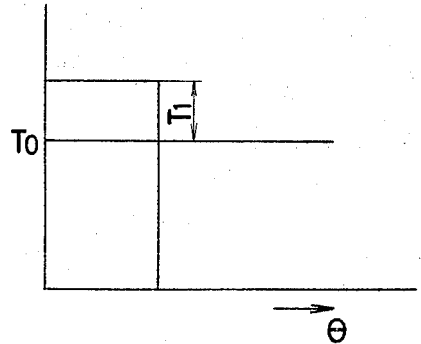
FIG. 5(B) is a graph showing worm torque versus worm rotation angle characteristics of the playback transducer drive system of the present invention, wherein the constant voltage signal is applied to the motor.

The present intermittent playback tracking can be achieved through the use of a constant voltage signal instead of the above-mentioned sawtooth waveform signal. FIGS. 5(A) and 5(B) show this example.

In this example, the constant voltage signal is applied to the reversely rotatable motor 68 till the output signal of the worm rotation checker 74 changes from the high level to the low level (see FIG. 5(A)). The output torque is a fixed value as shown in FIG. 5(B). FIG. 5(B) shows the relationship between the rotation angle $\theta$ of the worm 62 (along the abscissa axis) and the output torque of the reversely rotatable motor 68 (along the ordinate axis).

The constant voltage level must be selected to fulfill the following condition in order to perform an accurate intermittent advance.

$$T_1 \cdot \theta_o < (\theta_o/2) \cdot T_o$$

or $$T_1 < T_o/2$$

The invention being thus described, it will be obvious that the same may be varied in many ways. Such variations are not to be regarded as a departure from the spirit and scope of the invention, and all such modifications are intended to be included within the scope of the following claims.

What is claimed is:

1. A disc player system comprising:
   support means for supporting a disc which carries information recorded thereon;
   first motor means for rotating said support means;
   first sensor means for detecting the number of rotations of said support means and developing an output in accordance therewith;
   playback transducer means for reading out the information recorded on said disc;
   drive means for shifting said playback transducer means on said disc;
   second motor means having a rotatable drive shaft for activating said drive means;
   second sensor means for detecting the number of rotations of said drive shaft and developing an output in accordance therewith; and
   control circuit means responsive to said output from said first and second sensor means for selectively activating said second motor at at least two different modes, said two different modes comprising:
   a fast rotation mode for shifting said playback transducer means at a high speed; and
   a slow rotation mode for shifting said playback transducer at a low speed for performing a playback operation.

2. The disc player system of claim 1, wherein said control circuit means comprises:
   correlation means responsive to said output from said first and second sensor means for correlating the rotation of said second motor means in said slow rotation mode with the rotation of said first motor means.

3. The disc player system of claim 2, wherein said correlation means intermittently develops a voltage signal to activate said second motor means in said slow rotation mode in response to the outputs from said first and second sensor means, said voltage signal being developed in response to a predetermined number of rotations of said support means.

4. The disc player system of claim 3, wherein said voltage signal has a slope increasing from a pre-selected level.

5. The disc player system of claim 4, which further comprises:
   detection means for detecting a shift length of said playback transducer in said slow rotation mode, said voltage signal being reduced to a zero level when the playback transducer is shifted by a predetermined length.

6. The disc player system of claim 1, 2, 3, 4 or 5, wherein said second motor means comprises a reversably rotatable D.C. motor.

7. The disc player system of claim 1, 2, 3, 4 or 5, wherein said drive means shifts said playback transducer in a linear tracking fashion.

8. The disc player system of claim 5, wherein said drive means include a worm means for transforming the rotation of said second motor means into a corresponding movement of said playback transducer means.

9. The disc player system of claim 8, wherein said detection means comprises:
   a slit plate fixed to said worm; and
   an optical sensor means for detecting rotation of said slit plate.

10. The disc player system of claim 2, wherein said correlation means comprises:
    frequency divider means responsive to said output from said first sensor means for developing an output signal when a predetermined number of outputs from said first sensor means is received;
    timing signal generating means responsive to said output signal from said frequency divider means and to said output from said second sensor means for correlating the rotation of said second motor means in said slow rotation mode with the rotation of said first motor means and for developing a control signal in accordance therewith;
    waveform generating means for developing a predetermined type of voltage waveform having a period corresponding to the length of time said control signal is developed by said timing signal generating means; and
    means for applying said predetermined type of voltage waveform to said second motor means.

11. The disc player system of claim 10, wherein said fast rotation mode includes a fast forward mode and a fast reverse mode;
    wherein said correlation means further comprises:
    a fast forward control signal generating means for developing a fast forward control signal when said fast forward mode is selected, and
    a fast reverse conrol signal generating means for developing a fast reverse control signal when said fast reverse mode is selected; and
    wherein said means for applying comprises selector means for selecting either said predetermined type of voltage waveform, said fast forward control signal, or said fast reverse control signal to energize said second motor means.

* * * * *